United States Patent [19]

Bucher

[11] Patent Number: 5,634,532

[45] Date of Patent: Jun. 3, 1997

[54] BRAKE SYSTEM FOR TRAVELING CONTAINER

[75] Inventor: Peter Bucher, Pfaffikon, Switzerland

[73] Assignee: Bucher Management AG, Fällanden, Switzerland

[21] Appl. No.: 423,992

[22] Filed: Apr. 18, 1995

[30] Foreign Application Priority Data

Apr. 21, 1994 [CH] Switzerland .................. 01224/94

[51] Int. Cl.⁶ .................................................. B60B 33/00
[52] U.S. Cl. .................................. 188/1.12; 188/21; 188/74
[58] Field of Search ........................... 188/9, 10, 16, 188/19, 20, 106 R, 116, 118, 1.12, 29; 280/87.01; 192/93 R, 93 A, 995; 74/99 A, 478.5, 512

[56] References Cited

U.S. PATENT DOCUMENTS

| | | | |
|---|---|---|---|
| 4,175,783 | 11/1979 | Pioth | 188/1.12 |
| 4,526,253 | 7/1985 | Schmidt | 188/1.12 |
| 4,875,696 | 10/1989 | Welch | 188/1.12 |
| 4,922,574 | 5/1990 | Heiligenthal | 188/1.12 |
| 5,244,062 | 9/1993 | Felton | 188/1.12 |
| 5,261,682 | 11/1993 | Chuang | 188/1.12 |
| 5,479,840 | 1/1996 | Hilliard | 188/1.12 |

FOREIGN PATENT DOCUMENTS

| | | |
|---|---|---|
| 0072491 | 2/1983 | European Pat. Off. . |
| 0332876 | 9/1989 | European Pat. Off. . |
| 0447863 | 9/1991 | European Pat. Off. . |
| 2562860 | 10/1985 | France . |
| 3042599 | 6/1982 | Germany . |
| WO/9012721 | 11/1990 | WIPO . |

*Primary Examiner*—Robert J. Oberlleitner
*Assistant Examiner*—C. T. Bartz
*Attorney, Agent, or Firm*—McAulay Fisher Nissen Goldberg & Kiel, LLP

[57] ABSTRACT

The braking system for movable container or trolley (1) is formed from three different, separate modules, namely in each case one brake module (20) on each brakeable wheel, at least one pedal module (30) and a connecting and transmission module (40) with sliding rods (42) connecting the pedal modules to all the brake modules. The brake module is operated by means of working surfaces (46) on the sliding rods (42) and has a lifting device (22) for operating the wheel brake (25). This leads to a rational, easily installable and easily operable braking system with reliable braking characteristics.

21 Claims, 8 Drawing Sheets

BRAKE SYSTEM FOR TRAVELING CONTAINER

The invention relates to a brake system for a movable container, particularly for a trolley as well as to a brake module for a braking system.

For handing drinks and other good, more particularly in passenger aircraft, but also in trains, buses, ships and e.g. also in hospitals use is made of movable containers, known as trolleys or carts. When not in use they remain stowed and secured in the galley area, so that in the case of violent displacement or flight movements or also in the case of an accident or emergency landing they cannot be thrown about. In order to provide service, the trolleys are moved by the cabin crew during flight through the narrow aisles in order to hand out the content thereof to the passengers. Modern trolleys have a considerable total weight of up to 90 kg and in exceptional cases up to 120 kg. The dimensions and useful volume are generally predetermined, because a maximum volume must be utilized for the content in the case of extremely compact external dimensions and a relatively limited weight of the movable container of e.g. only 30 cm, which is also due to the narrow aisles, particularly in aircraft, but also in trains and long-distance buses. This inter alia necessarily leads to small wheels and to braking systems, which are no longer able to meet the requirements concerning efficiency, safety, user friendliness, maintenance and manufacturing costs. Despite the restricted space conditions for the wheels and brakes it must be possible to safely brake and secure the moving container under turbulent flight conditions, or e.g. during the ascent. Other securing systems such as e.g. anchoring to the seat have also not proved satisfactory for operational and cost reasons.

The problem of the present invention is therefore to overcome the inadequacies of the hitherto existing brakes and to provide a braking system, which can be rationally manufactured, easily fitted, which is maintenance-friendly and robust, as well as giving good and reliable braking characteristics in the case of easy use and operation.

The pedal module is constructed to include a brake operating pedal and a brake release pedal. The transmission module includes at least one longitudinally movable rod articulated to each of the pedals of the pedal module for horizontal longitudinal movement in response to a compressively applied force on a respective pedal. Each brake model includes a brake block for engaging and braking a wheel unit as well as a lifting device articulated to the rod for moving the block into engagement with the wheel unit in response to actuation of the brake operating pedal and longitudinal movement of the rod in one direction and for moving the block from engagement with the wheel unit in response to actuation of the brake release pedal and longitudinal movement of the rod in an opposite direction.

Through the subdivision into three simple, easily fittable modules, namely the pedal module, connecting and transmission module and in each case one brake module on each wheel unit to be braked, an easily operated and universally usable system with reliable braking characteristics is created.

The braking system also has further improved characteristics with respect to rational manufacture and maintenance, efficient handling and safety. Further advantages are that the system allows a flat container bottom, without the hitherto projecting and complicated brake transmission mechanisms, whilst in the case of using suitable wheel or caster units the entire braking system, including the wheels, can be given a washing machine-resistant construction.

The invention is described in greater detail hereinafter relative to the embodiments and drawings, wherein show.

Figure 1A:
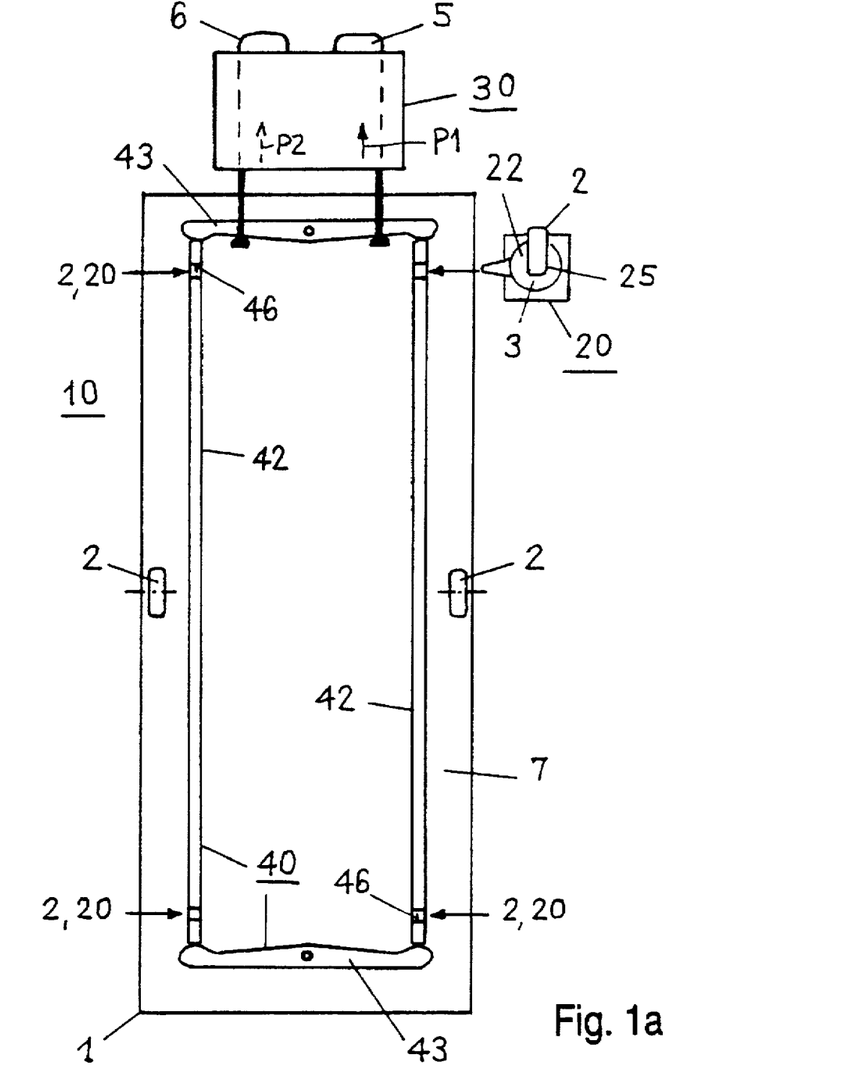
FIGS. 1a and b Diagrammatically a braking system with modules according to the invention.

Considered from below on a movable container or trolley 1 or on its base plate 7, FIG. 1a shows a brake system 10 according to the invention having a pedal module 30, a connecting and transmission module 40, as well as brake modules 20.

The pedal module 30 has a brake operating mechanism 5 and a brake release mechanism 6, e.g. in the form of pedals. To each wheel unit 2 to be braked is fitted a brake module 20 with a wheel brake 25. No brake module is used on wheel units not to be braked. The wheel or caster units can have a single wheel, as in FIGS. 1 and 2, or a double wheel, as in FIGS. 3, 6 and 11. Correspondingly a brake block acts on one or both wheels or casters 2. FIG. 1a shows six wheels or wheel units, whereof only the four outer wheels are swivellable and brakeable, i.e. are in each case constructed with a brake module 20, whereas the two inner wheels are fixed and not braked. As a result of the modular construction according to the invention random variants can be constructed in a simple and rational manner, e.g. also small four-wheel trolleys with four or only two braked wheels. For this purpose FIG. 1b illustrates an embodiment with only one rocker arm 43 and a pedal module 30.

Figure 2A:
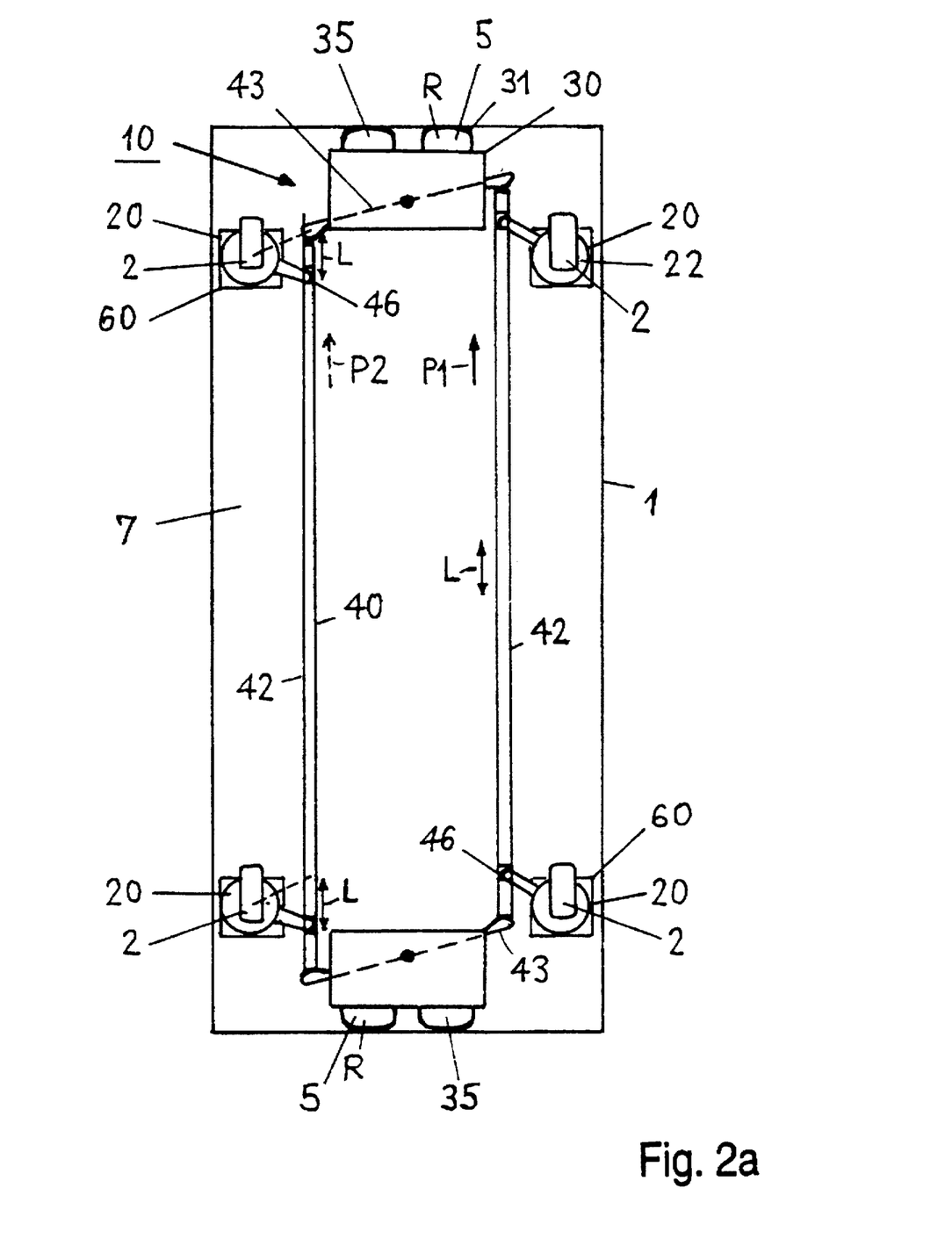
FIGS. 2a and b Pedal and brake wheel modules in two views.
Figure 11A:
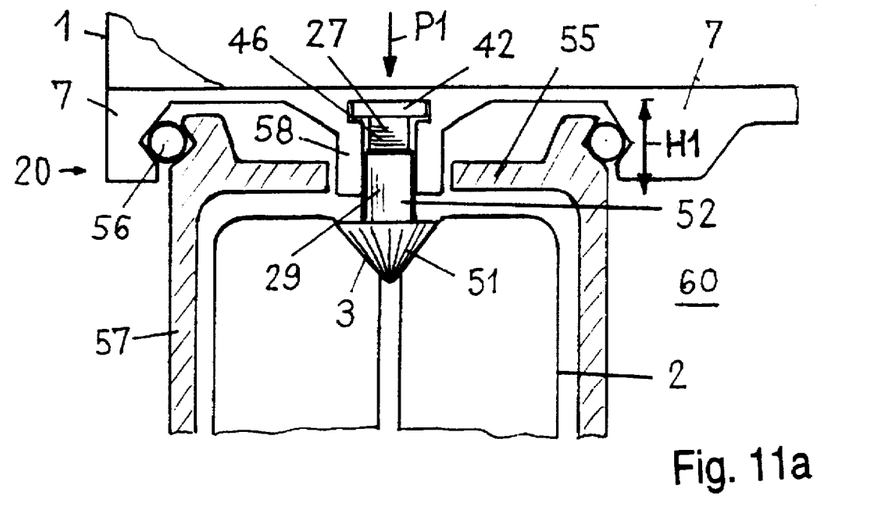
FIGS. 11a and b A brake module with direct operation by a ramp on the sliding rod.
Figure 11B:
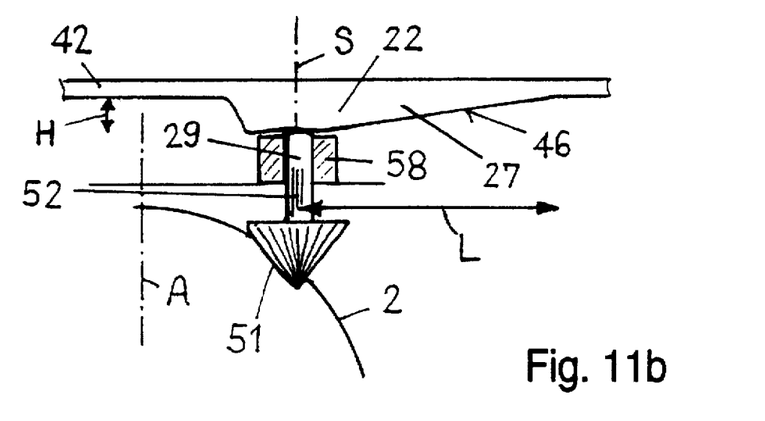
Figure 12:
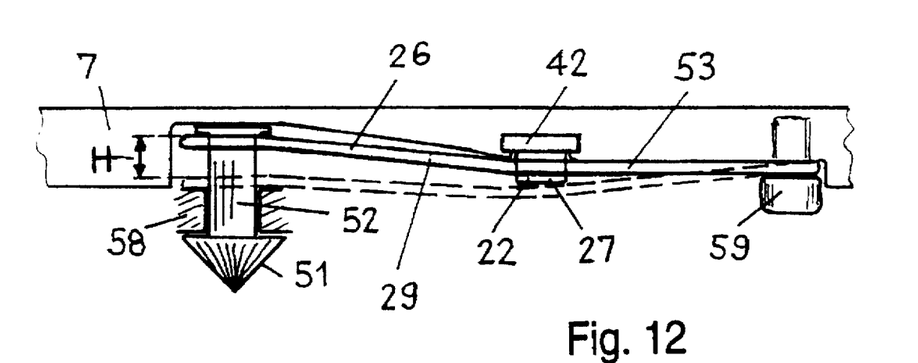
FIG. 12 A brake module with lever transmission element.

In the embodiment of FIGS. 2a and b the movable container 1 has four rotary, brakeable wheels 2 with brake modules 20 and in each case one pedal module 30 with pedals 31 on both longitudinal sides of the trolley 1. A wheel unit 2 and a brake module 20 can form a wheel-brake unit 60 (cf. FIGS. 6 and 11a). By means of a rocker arm 43 a brake pedal acts on sliding rods 42. The two rocker arms 43 and two sliding rods 42 form a parallelogram of forces operated solely by compressive forces P1 and P2. As no tensile forces have to be transferred, these components can be given a very simple construction and can be assembled without complicated coupling means such as screws, rivets, etc. All the braking forces are indicated by the arrows P1 and all the brake release or restoring forces by arrows P2. To the sliding rods 42 are fitted working surfaces 46, e.g. as abutting surfaces 47 (FIGS. 6 to 8) or as ramps 27 (FIGS. 11 and 12). These working surfaces in turn exert compressive forces P1 on the transmission elements (rocking lever 21, FIG. 6) and lifting devices 22 of the brake modules 20 by means of which a brake block is pressed against the wheels 2 and the brake is fixed. As explained further relative to FIG. 4, the pedal module 30 has a brake pedal 5 and a brake release pedal 35.

Figure 1B:
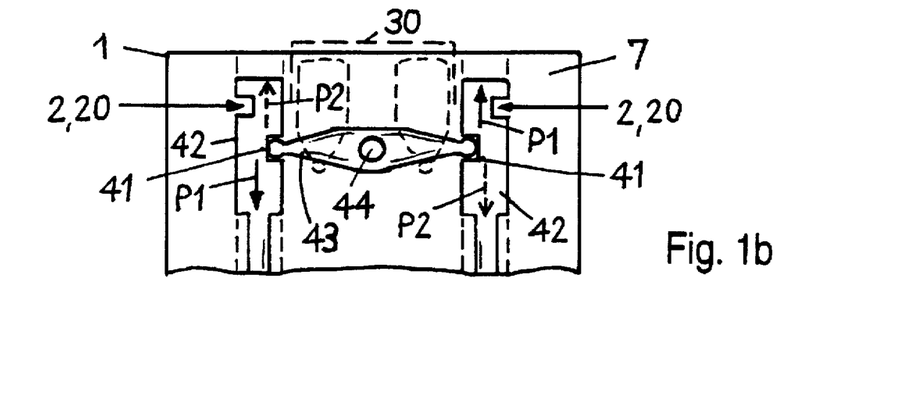

The embodiment of FIG. 1b has a rocker arm 43 engaged on a trunnion 44 and its two ends are inserted in recesses 41 of the sliding rods. Therefore here both sliding rods 42 can be moved by a single rocker arm 43 in both directions P1

(braking) and P2 (release brake) by means of impact forces. Thus, four brake modules on four wheels can be operated by means of two sliding rods with only one rocker arm 43 and one pedal module 30.

Figure 2B:
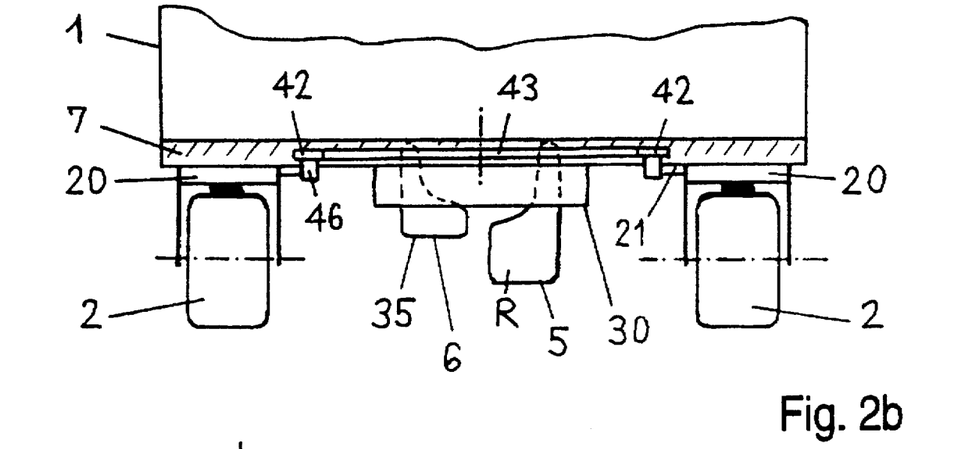

The front view of FIG. 2b shows the extremely space-saving construction of the system, in that here the sliding rods 42 and the rocker arms 43 are completely integrated into the container bottom 7. Therefore the container bottom 7 is completely flat between the wheels 2. Thus, on passing over thresholds and obstacles it cannot hook in or become stuck and therefore damaged. The brake modules are also at least partly countersunk into the container bottom 7 and consequently have a minimum overall height H1 (cf. FIGS. 6, 9 and 11).

Figure 3:
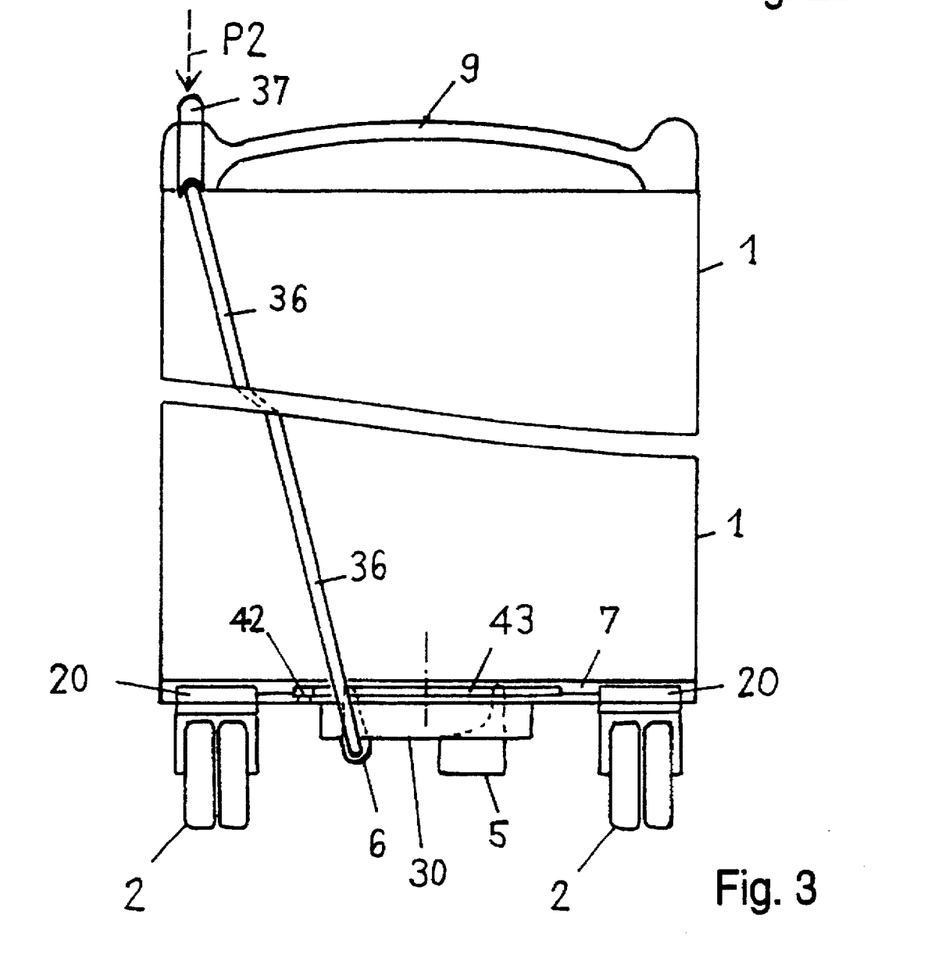
FIG. 3 A system with a brake release mechanism on the handle of the movable container.

FIG. 3 shows as a brake release mechanism 6, in place of a pedal, a connecting or push rod 36 extended upwards in the handle 9 of the trolley 1 and which has a pushbutton 37 in said handle. As illustrated in FIG. 5, the push rod 36 transfers the brake release force P2 via the lever 6 to the rocker arm 43 in the same way as the pedal 35 in FIG. 4. This variant permits a particularly easy handling of the trolley 1.

Figure 4:
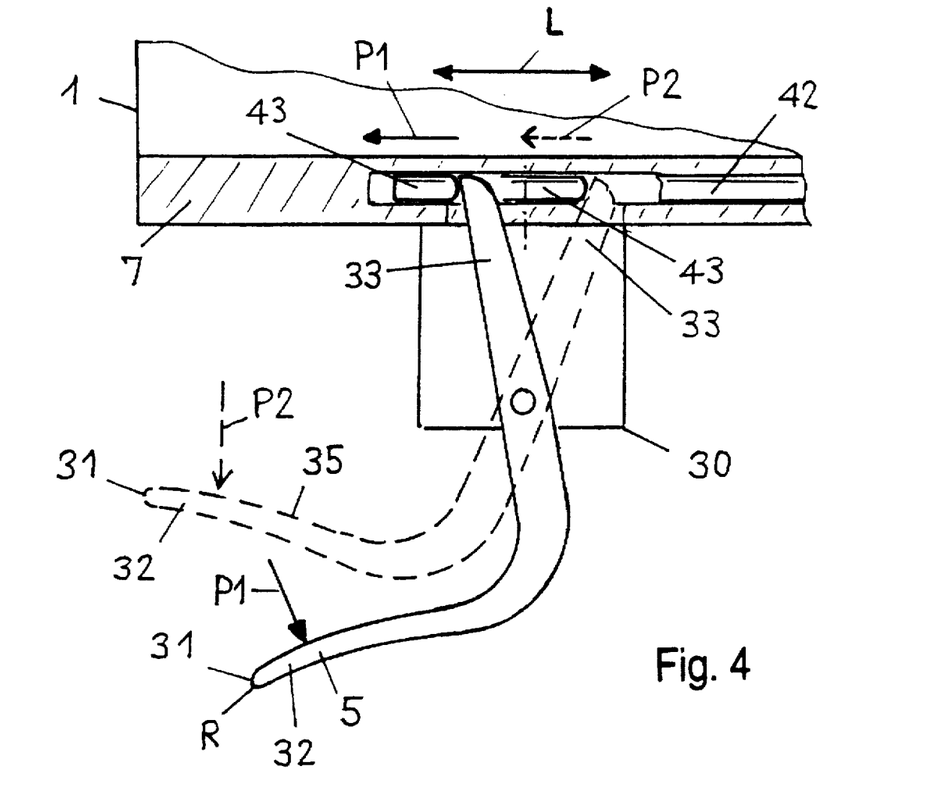
FIG. 4 A pedal module with two pedals.
Figure 5:
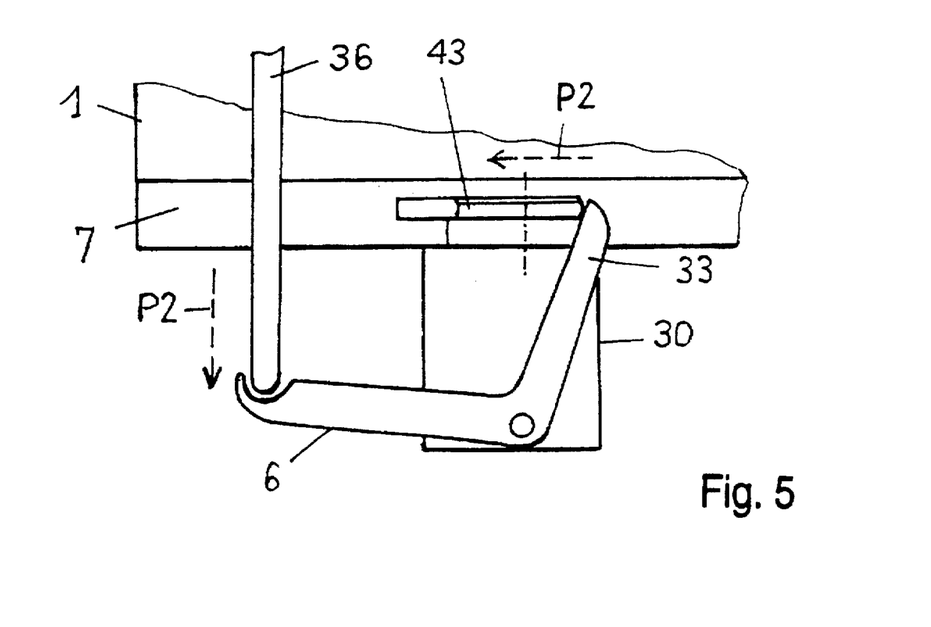
FIG. 5 A brake release mechanism.

FIG. 4 shows a pedal module 30 with two pedals, a brake pedal 5 and a brake release pedal 35. The pushing down (P1) of the foot part 32 brings about through the sliding part 33 a displacement of the rocker arm 43 in the braking direction P1, whereas in identical manner thereto by depressing (P2) the release pedal 35 the rocker arm on the other side is moved in the release direction P2. The brake pedals 5 can e g. be given a red colour (R), so that the pressed down state P1, when the brake is fixed, can be easily seen from above. The brake release pedal 35 can be raised again by operation with a spring, so that in the braked state, the fixed, downwardly hanging, red brake pedal 5 (R) is visible, whereas in the unbraked state no pedal is visible. In another possible variant the functions of the two pedals 5 and 35 can e g. be combined in a double pedal. By pressing down the brake is applied and by raising the double pedal is released again, e g. by means of a fork on the sliding part 33, which correspondingly operates the rocker arm 43 in both directions P1 and P2.

Figure 6:
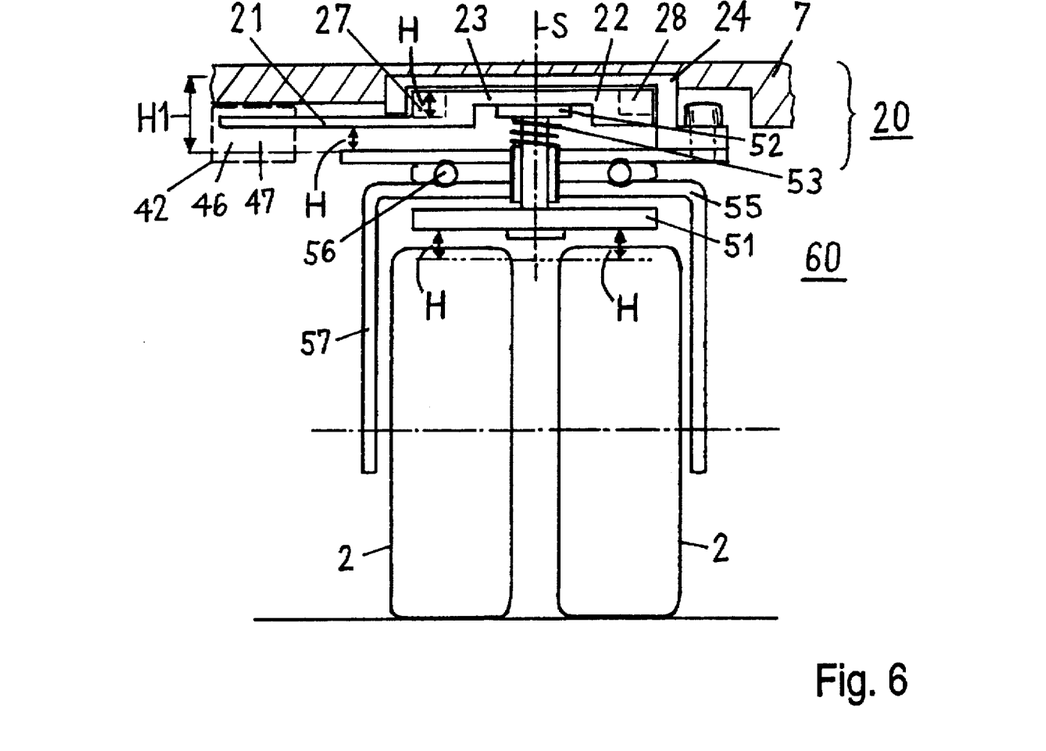
FIG. 6 A brake module with rocking lever and link disk.
Figure 7A:
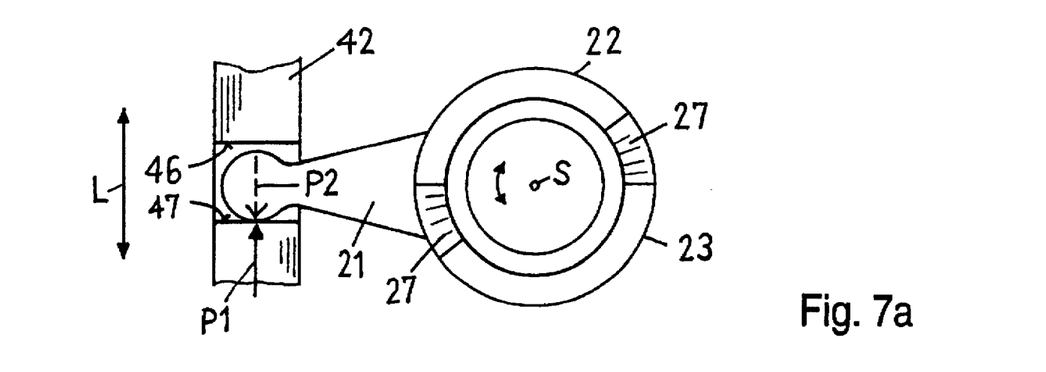
FIGS. 7a and b A link disk with rocking lever.
Figure 7B:
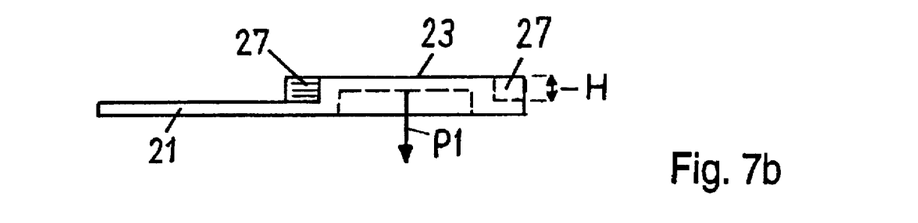

FIG. 6 shows an embodiment of a brake module 20 with a wheel unit 2, which contains as a lifting device 22 a link disk 23 which, according to FIGS. 7a and 7b, has a rocking lever 21 and at least two equidistant ramps 27. As working surfaces 46 vertical abutting surfaces 47 are fitted to the sliding rods 42. These abutting surfaces can e.g. be milled into the sliding rods or engage thereon. The rocking lever 21 is inserted between these abutting surfaces 47, so that linear movements L of the sliding rods can be transferred to the rocking lever 21 and the link disk 23. A fixed counterpart for the same is formed by the module casing 24 in FIG. 6 with cams 28 on which run the ramps 27. By rotating the link disk 23 the latter is raised by a distance or stroke H and consequently a plunger 52 of the lifting device 22 is moved vertically with a brake plate or a brake block 51. The wheel unit 2 with mounting support 57, rotary table 55 and bearing 56 is freely rotatable by 360° (casters). For this purpose the plunger 52 is located in the wheel swivel axis and the brake block 51 is shaped in rotationally symmetrical manner. On releasing the brake P2 the brake plate 51 is raised from the wheel by a return spring 53. The link disk brings about a transformation of the sliding length L of the rod 42 of e.g. 25 to 40 mm into a stroke H of e.g. 3 to 5 mm. This sliding length L is transformed into a pedal stroke of e.g. 30 to 50 mm by means of the pedals 5 and 35 and the rocker arm 43.

As indicated in FIG. 6, when the brake operating pedal 5 is actuated, the rod 42 slides in one direction so that the lever 21 of the disc 23 is rotated and caused to move downwardly, as viewed, by sliding of the ramps 27 on the cams 28 of the casing 24. This, in turn, causes the plunger 52 to move downwardly thereby moving the brake plate 51 into contact with the wheel unit 2. Movement of the rod 42 in the opposite direction via actuation of the brake release pedal 35 causes an opposite rotation of the disc 23. This, in turn, allows the plunger 52 to be biased upwardly by the spring in a brake release direction.

Figure 8A:
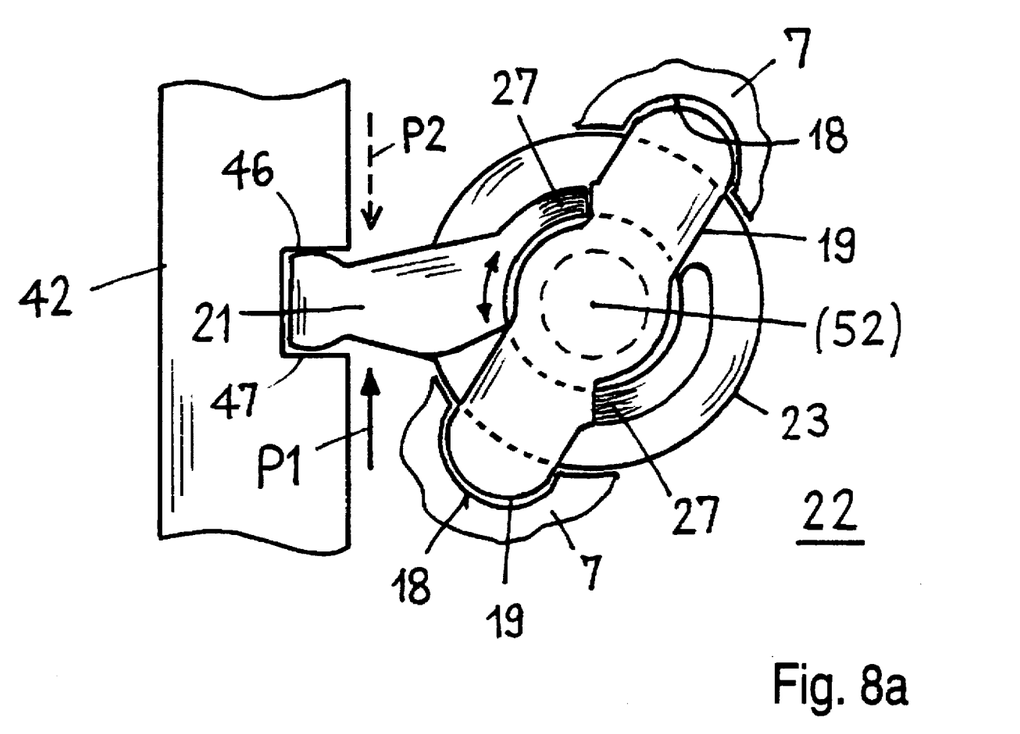
FIGS. 8a and b A lifting device with a lifting part.
Figure 8B:
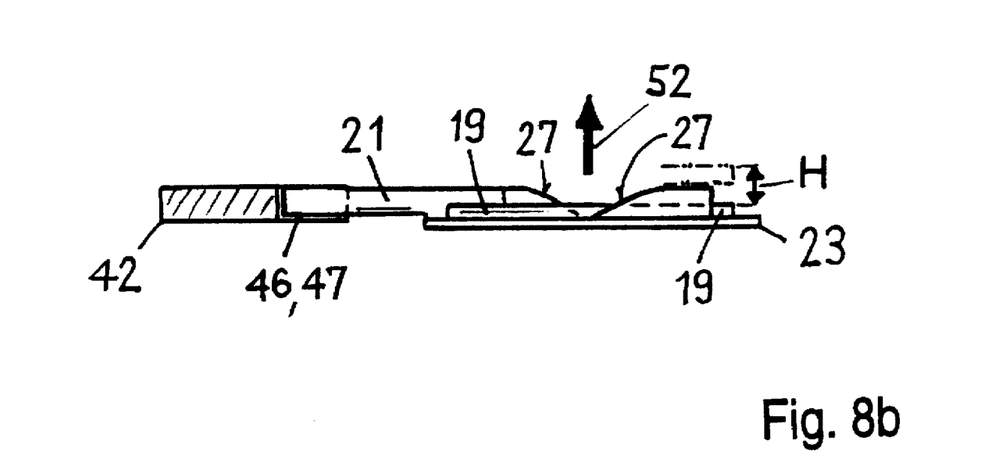

FIGS. 8a and b show a further embodiment with particularly flat sliding rods 43, as are also used in FIG. 1b. The operation of the rocking lever 21 here takes place by recesses in the sliding rods, which also form working surfaces 46 in the form of abutting surfaces 47. Unlike e.g. in FIGS. 6 and 7 as a counterpart 28 to the ramps 27 of the link disk 23 a non-rotary lifting part 19 is inserted in recesses 18 of the container bottom 7. On operating the brakes in the direction P1 the lifting part 19 is raised by the ramps 27, so that the lifting part moves a brake plunger 52 resting thereon.

Figure 9:
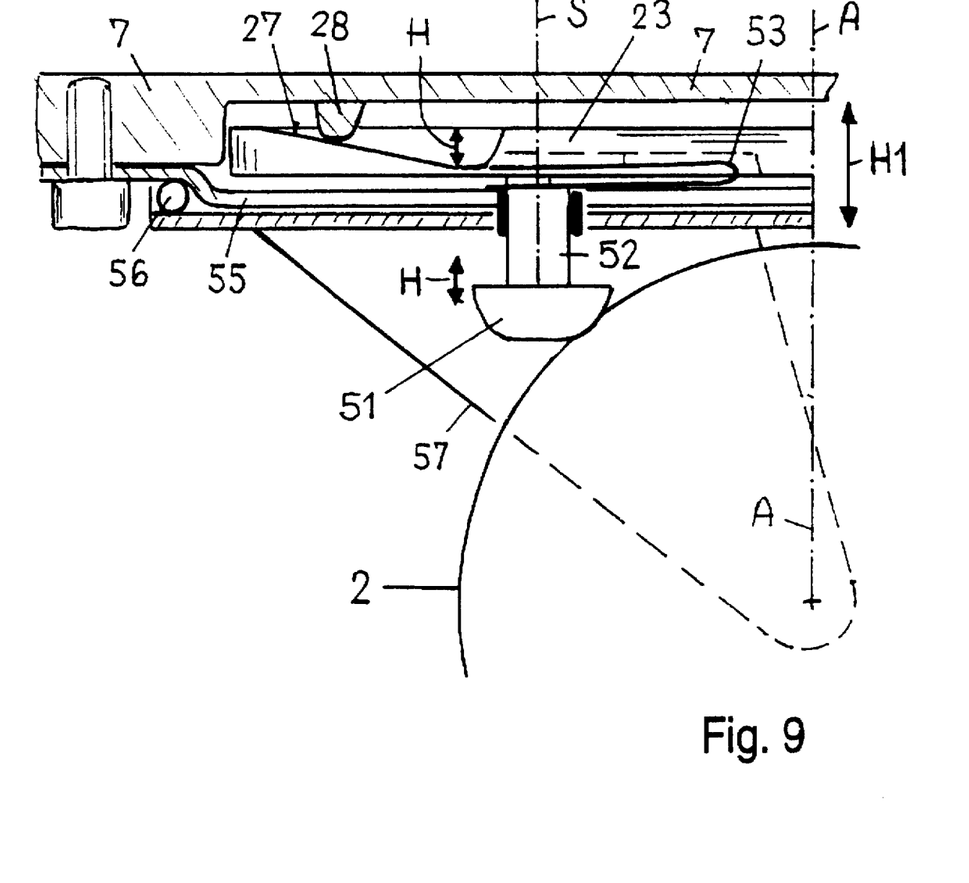
FIG. 9 A further example of a brake module.

FIG. 9 shows another embodiment of a brake module with link disk 23 as the lifting device 22. From this side view of the wheel 2 it is possible to see the attainable minimum overall height H1. As a result of the displacement of the wheel swivel axis S with brake plunger 52 with respect to the wheel vertical axis A space is created alongside the wheel for the brake block, so that the effectively necessary additional overall height for the brake module, including the brake block, is very small. The brake module is also countersunk into the container bottom 7, the casing with the cams 28 as the counterpart to the ramp 27 of the link disk 23 also being integrated into the container bottom 7. A flat return or restoring spring 53 is housed within the link disk 23. The additional overall height H1 necessary for the brake module between the container bottom 7 and the wheel 2 can therefore be reduced to an absolute minimum of e.g. only a few millimeters.

Figure 10:
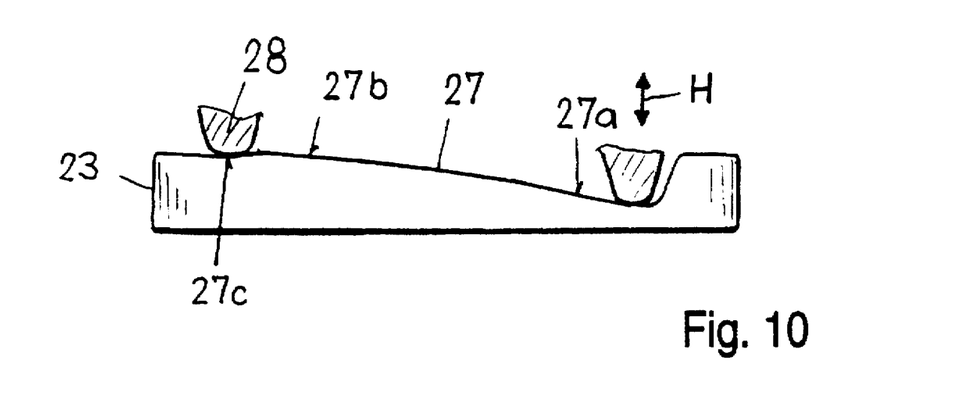
FIG. 10 A ramp with a variable gradient.

FIG. 10 shows an embodiment of a ramp 27 on a link disk 23, which initially has a steeper gradient 27a and at the end (with the brake applied) has a shallower gradient 27b. At the end of the ramp is provided a shallow depression 27b, in which is locked the cam 28 as the counterpart when the brake is applied. Therefore the wheel brake is fixed. In the same way the ramps 27 on the sliding rods 42 and the counterparts 29, which are moved up and down in the embodiments of FIGS. 11 to 12 are matched to one another.

The embodiment of FIGS. 11a and b shows another, particularly simple, lightweight and space-saving variant of a wheel brake module 60. The swivel bearing 56 is here also integrated into the bottom 7. The wheel mounting support 57 also forms the rotary table 55 of the bearing. To the sliding rods 42 are fitted ramps 27, which act directly on the brake block 52 as the transmission element 29 (P1). The sliding length L of the sliding rods is therefore directly transformed into the stroke H on the brake 51, 52. The brake bolt 52 is adapted with a flat, cylindrical rounding to the ramp 27 and guided in parallel by the guide 58, so that it does not rotate. The rotationally symmetrical, conical brake block 51 corresponds to the swivellable wheels 2.

The braking system according to the invention is preferably manufactured from light construction materials such as plastics and light metals or alloys, e.g. having a base plate of aluminium, in which it is easy to produce the depressions and grooves for brake modules and sliding rods.

The wheels 2 with the mounting supports 57 and rotary tables 55 are e.g. preferably made from polyurethane and for the balls of the bearing 56 are e.g. suitable polyoxymethylene (POM). The ramps 27 on the sliding rods 42 and link disk 23 are preferably made from suitable plastics having low friction coefficients. All the friction pairs are at least partly made from plastics, so that there is no need for lubricants (as for metal ball bearings). The entire braking system, including the wheel brake units 60 with brake modules and wheels, can consequently not only be made particularly light, but can also be made washing machine-resistant. All this ultimately leads to a particularly simply constructed, rationally manufacturable and secure braking system with optimum service and operating characteristics.

FIG. 12 shows a variant of the embodiment of FIG. 11. The ramps 27 of the sliding rods once again act directly on the transmission element 29 in the form of a one-arm lever, which is fixed at one end by means of a screw 59 to the bottom 7. The other lever end is connected to the brake plunger 52. This gives a lever transmission of e.g. 1:2, i.e. 2 mm stroke on the ramp 27 corresponds to a 4 mm stroke H on the brake. The lever part 26 can be constructed as a pressure and compensating spring and the lever part 53 as a brake return spring. This is brought about by a corresponding dimensioning, e.g. as leaf springs, and the nature of the fixing device 59.

I claim:

1. In combination,
    a trolley having base plate and a plurality of wheel units mounted on an underside of the said base plate;
    a braking system for braking and unbraking of at least some of said wheel units, said braking system including
    at least one pedal module mounted on said base plate and including a brake operating pedal and a brake release pedal;
    a transmission module including a pair of parallel rods slidably mounted relative to said base plate and at least one pivotally mounted operating lever in contact with each of said rods to transfer only a compressive force to each rod in response to pivoting of said layer, each said pedal of said pedal module being in contact with an opposite side of said operating lever from the other of said pedals to pivot said operating lever only under a compressively applied force from said respective pedal and to effect horizontal longitudinal movement of each of said parallel rods; and
    at least a pair of independently mounted brake modules, each said brake module being disposed at a respective one of said wheel units and including a brake block for engaging and braking said respective one of said wheel units and a firing device articulated to a respective sliding rod for moving said brake block into engagement with said respective one of said wheel units in response to longitudinal movement of said respective rod in one direction under a compressive force therein and for removing said brake block from engagement with said respective one of said wheel units in response to longitudinal movement of said respective rod in an opposite direction to said one direction.

2. The combination as set forth in claim 1 wherein said trolley has four of said wheel units disposed in a rectangular array with each said wheel unit having a respective one of said brake modules thereat.

3. The combination as set forth in claim 2 wherein said trolley further has a pair of said wheel units disposed intermediately thereof and independent of said braking system.

4. The combination as set forth in claim 1 wherein said braking system includes a manually operable push rod extending vertically upwardly from said brake release pedal to a position near a top of said trolley.

5. The combination as set forth in claim 4 wherein said trolley includes a handle and a push button in said handle and wherein said push rod extends to a point under said push button for actuation thereby.

6. The combination as set forth in claim 1 wherein said braking system has a pair of said pedal modules, each pedal module being disposed at an opposite narrow end of said trolley and wherein a pair of said operating levers are connected to said rods in a parallelogram arrangement with each pedal module articulated to a respective lever.

7. The combination as set forth in claim 1 wherein each rod has at least one pair of vertical surfaces and a respective brake module has a rocking lever disposed at one end between said vertical surfaces and contacting said lifting device at an opposite end to raise and lower said lifting device in response to pivoting of said lever.

8. The combination as set forth in claim 1 wherein at least one of said pedals has a foot part for actuation thereof and a sliding part engaging said operating lever to transfer a pushing force therebetween.

9. The combination as set forth in claim 1 wherein each said pedal has a foot part for actuation thereof and a sliding part engaging said operating lever to transfer a pushing force therebetween.

10. The combination as set forth in claim 1 wherein said operating lever of said transmission module is recessed within said base plate.

11. The combination as set forth in claim 1 wherein each brake module includes a spring biasing said lifting device away from said wheel unit.

12. The combination as set forth in claim 1 wherein each lifting device includes a ramp slidably engaging said brake block for moving said brake blocking response to movement of said respective sliding rod.

13. The combination as set forth in claim 1 wherein said lifting device is a ramp on a respective sliding rod.

14. The combination as set forth in claim 13 wherein said lifting device has a lever disposed transversely of and in contact with said is fixed at an opposite end to said brake block.

15. The combination as set forth in claim 1 wherein said lifting device includes
    a rotatably mounted disk having a pair of ramps thereon and a lever articulated to a respective sliding rod for rotating said disk in response to longitudinal movement of said sliding rod;
    an element secured in said base block and being in slidable contact with said ramps for being raised relative to said disc in response to rotation of said disk in one direction;
    a plunger connected to said brake block and abutting one of said element and said disc at one end for moving said brake block in a braking direction in response to moving of said disc relative to said element; and
    a spring about said plunger for lifting said plunger and said brake block in said brake release direction in response to moving of one of said element and said disc.

16. The combination as set forth in claim 15 wherein each ramp has a greater gradient at one end than the other end thereof.

17. The combination as set forth in claim 15 wherein at least one of said disk and said element is made of plastic.

18. The combination as set forth in claim 15 wherein at least one of said disk and said element is injection molded, cast or forged.

19. The combination as set forth in claim 1 wherein each brake module is countersunk into said base plate.

20. The combination as set forth in claim 1 wherein each brake module and respective wheel unit forms a unit.

21. In combination
- a trolley having at least one wheel unit mounted on an underside thereof; and
- a brake system for braking and unbraking of said wheel unit, said braking system including
  - at least one pedal module mounted on said trolley and including a brake operating pedal and a brake release pedal;
  - a transmission module including at least one pivotally mounted operating lever in contact with each said pedal to receive only a compressive force from each said pedal in response to movement of a respective pedal and at least one longitudinally movable rod in contact with said layer to receive only a compressive force from said lever in response to pivoting of said lever for horizontal longitudinal movement thereof in response to a compressively applied force from a respective pedal; and
  - a brake module including a brake block for engaging and braking said wheel unit and a lilting device articulated to said rod for moving said block into engagement with said wheel unit in response to actuation of said brake operating pedal and longitudinal movement or said rod in one direction under a compressive force therein and for moving said block from engagement with said wheel unit in response to actuation of said brake release pedal and longitudinal movement of said rod in an opposite direction to said one direction.

* * * * *

UNITED STATES PATENT AND TRADEMARK OFFICE
CERTIFICATE OF CORRECTION

PATENT NO. : 5,634,532

DATED : June 3, 1997

INVENTOR(S) : Peter Bucher

It is certified that error appears in the above-indentified patent and that said Letters Patent is hereby corrected as shown below:

Column 1, line 7, change "drinks and other good" to -out meals, drinks and other goods Column 5, line 38, change "layer" to -lever Line 49, change "firing" to -lifting- Column 6, line 40, after "with said" insert -ramp and"

Column 8, line 7, change "lilting" to -lifting-

Signed and Sealed this

Twenty-sixth Day of August, 1997

Attest:

BRUCE LEHMAN

Attesting Officer     Commissioner of Patents and Trademarks